United States Patent Office 3,595,902
Patented July 27, 1971

3,595,902
HYDROXYCYCLOALKANONES
Paul Bellet, Paris, and Truong Van Thuong, Clichy-sous-Bois, France, assignors to Roussel-UCLAF, Paris, France
No Drawing. Original application Apr. 19, 1966, Ser. No. 543,531, now Patent No. 3,432,393, dated Mar. 11, 1969. Divided and this application Oct. 7, 1968, Ser. No. 786,519
Claims priority, application France, Apr. 28, 1965, 15,005
Int. Cl. C07c *61/36, 69/74*
U.S. Cl. 260—468R        1 Claim

ABSTRACT OF THE DISCLOSURE

Optically active 1-hydroxycycloalkane-3-ones selected from the group consisting of levorotatory 1β-hydroxy-2β-methyl - 2α - (3′ - oxo - 6′ - carbomethoxy - hexyl) - cyclopentane-3-one, dextrorotatory 1-β-hydroxy-2α-methyl-2β-(3′ - oxo - 6′ - carbomethoxyhexyl) - cyclopentane - 3 - one and levorotatory 3-methoxy-8,14-seco-Δ$^{1,3,5(10),9(11)}$-estratetraene-17-ol-14-one of the natural series. The compounds are optically active intermediates in the total synthesis of steroids.

PRIOR APPLICATION

This application is a divisional application of our copending U.S. patent application Ser. No. 543.531, filed Apr. 19, 1966, now Pat. No. 3,432,393.

OBJECTS OF THE INVENTION

An object of the present invention is the development of a process for the preparation of optically active 1-hydroxycycloalkane-3-ones of the formula

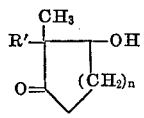

wherein n represents an integer selected from the group consisting of 1 and 2 and R′ represents a substituent selected from the group consisting of (1) an aliphatic carbon chain having from 4 to 18 carbon atoms, said carbon chain having functional groups selected from the group consisting of hydrogens, ketones, carboxyls, carboalkoxys, hydroxyls, alkoxys, halogens, double bonds, alkyls, aralkyls, aryls and cyclohexyls, and (2)

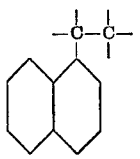

having functional groups selected from the group consisting of hydrogens, ketones, hydroxyls, halogens, alkoxys, double bonds and alkyls, which comprises the steps of subjecting a symmetric cycloalkane-1,3-dione of the formula

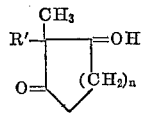

wherein R′ and n have the above-noted meanings, to the action of reducing enzymes produced by cultures of microorganisms selected from the group consisting of the Fungi imperfecti, the Actinomycetales, yeasts and bacteria, and recovering said optically 1-hydroxycycloalkane-3-ones.

Another object fo the present invention is the obtention of an optically active 1-hydroxycycloalkane-3-one selected from the group consisting of optically active 1β-hydroxy - 2 - methyl - 2(3′ - oxo-6′ - carbo - lower - alkoxy-hexyl)-cyclopentane-3-ones, levorotatory 1β-hydroxy-2β-methyl - 2α - (3′ - oxo - butyl) - cyclopentane - 3 - one, dextrorotatory 1-hydroxy-2-methyl-2-(3′-chloro-2′-buten-yl)-cyclopentane-3-one, levorotatory 3-methoxy-8,14-seco-Δ$^{1,3,5(10),9(11)}$-estratetraene-17-ol-14-one of the natural series and the levorotatory hemiacetal of 1-hydroxy-2-methyl-2-(3′-oxo-butyl)-cyclohexane-3-one.

These and other objects of the invention will become more apparent as the description thereof proceeds.

DESCRIPTION OF THE INVENTION

According to the invention, the starting cycloalkane diones and the resultant hydroxycycloalkanones have, respectively, the general Formulas I and II:

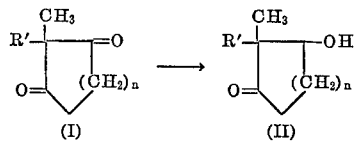

In the Formulas I and II, R′ represents a hydrocarbon substituent comprising 4 to 18 carbon atoms, capable of carrying ketonic groups, functional groups such as acids, esters, hydroxyls, alkyloxys, halogens and radicals, such as alkyls, aralkyls, aryls and cyclohexyls, constituting a straight or branched chain, saturated or unsaturated, or constituted by the group

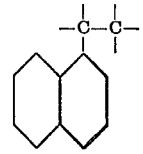

capable of having one or several multiple carbon-carbon bonds, and wherein n represents an integral number equal to 1 or 2.

The compounds I, the starting materials for the process of the invention, possess essentially the following characteristic features:

(1) They have a plane of symmetry and, therefore, are naturally unreasolvable.

(2) The two ketonic groups, capable of being converted by microbiological reduction into hydroxy groups, are placed on one and the same ring, pentagonal or hexagonal in β-position, one from the other.

(3) The carbon placed in α-position, between the two ketonic groups of compound I, supports two different substituents $CH_3$ and R′.

A microbiological reduction of these compounds I by a disymmetric reactant, such as an enzyme secreted by a strain of a micro-organism, with a view to obtain the optically active compounds II, was a reaction certainly delicate to be realized. It is not exactly known what would be the influence of the structure and of the spatial hindrance of the substituents $CH_3$ and R′, in immediate proximity in relation to the reaction, on the asymmetric reduction of only one of the two ketonic groups.

Moreover, in the eventuality of such a reduction, it could not be predicted with certainty which stereoisomer would be formed and what would be the degree of stereoselectivity of the reaction.

In effect, the conversion of compound I into compound II can lead to the formation of two adjacent asymmetric carbons and, consequently, provides the possibility of obtaining in variable proportion four optically active stereoisomers, among which one only is desired.

Finally, the compound II still comprising a ketonic group is capable of undergoing a more forceful reduction leading to the non-utilizable dihydroxylated compounds. It could also undergo diverse degradations in the reaction mixture particularly due to its β-ketal structure. All of these secondary reactions have to be avoided if a good yield in compound II and an easy separation of the latter are to be obtained.

The asymmetric reduction by microbiological means of compound I into a stereoisomer clearly defined in compound II would, consequently, appear most difficult. However, it has now been found that there is indeed, under the action of reducing enzymes, an asymmetric reduction of one only of the two ketonic groups of compound I, with the formation of compound II.

Furthermore, it was found that ketonic groups, carbon-to-carbon double bonds, a substituent such as a halogen or functional groups such as acids and esters, carried by R', do not influence the reduction in any perceptible manner.

It has also been discovered, and this is precisely one of the principal objects of the invention, that, following the experimental conditions of the reductions, in particular according to the choice of the micro-organism, it is possible to form in practically exclusive fashion a single one of the four optically active stereoisomers of compound II and to isolate the same under very satisfactory conditions.

The advantages provided by the invention will be clearly understandable by the the examples explained in detail later on. In the meantime, it has already been shown that this process by microbiological means does not require any onerous reactant and that it allows one to obtain an optically active compound II, starting with an inactive compound I, with a yield which is not limited and which may be quantitative under the best conditions.

This is not the case when the conventional methods of resolution by formation of two diastereoisomeric salts are utilized. Actually, in this case half of the starting racemic compound is lost, and the final yield of the resolved product rarely exceeds 40%. Moreover, this process must utilize a compound capable of undergoing salt formation.

As it can be concluded from the preceding, a process for the preparation of optically active 1-hydroxycycloalkane-3-ones of the general Formula II has been discovered characterized essentially in that the symmetric cycloalkane-1,3-diones of the general Formula I are subjected to the action of reducing enzymes, selected from the group consisting of the Fungi imperfecti, the Actinomycetales, the yeasts and bacteria, in particular, by the Rhizopus genus, such as *Rhizopus arrhizus* and *Rhizopus nigricans; Mucor spinosus; Curvularia falcata; Gongronela urceolifersa; Aspergillus niger; Streptomyces platensis;* the Saccharomyces genus and the Pseudomonas genus.

In the general Formula I and II, the substituent R' has the above-cited meanings. In particular, this substituent containing 4 to 18 carbon atoms can be alkyl, alkenyl, or alkadienyl, substituted with substituents selected from the group consisting of alkyl, ketone, halogen, carboxyl, carbo-lower alkoxy and hydroxy; as well as cyclic substituents such as phenylalkyl, substituted phenylalkyl, phenyl and cyclohexyl. In addition, R' can represent the group

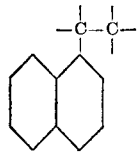

and particularly

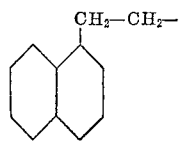

where the two rings represent the A and B rings of an eventual steroid. These two rings likewise can be substituted with the substituents named above and can contain one or more double bonds.

One of the most outstanding characteristics of the process of the invention lies in the fact, that this process is particularly suitable for the preparation of the optically active compounds of type II usable directly for the total synthesis of the natural steroids. Thus, when starting with the cyclopentanediones of type III, according to the process of the invention, optically active hydroxycyclopentanones of type IV are obtained, $R_1$ representing a lower alkyl radical in these formulas.

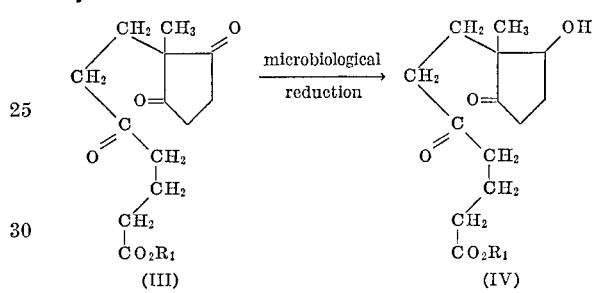

In the copending commonly assigned United States patent application Ser. No. 361,872, filed Apr. 22, 1964, now Pat. No. 3,413,314 a novel process is described for the synthesis of 19-nor steroids, wherein compound III, intermediately obtained by condensation of 2-methylcyclopentane-1,3-dione with a lower alkyl 5-oxo-6-heptenoate, is converted into the isomer of the bicyclic compound V, corresponding with the natural series, according to the following flow diagram:

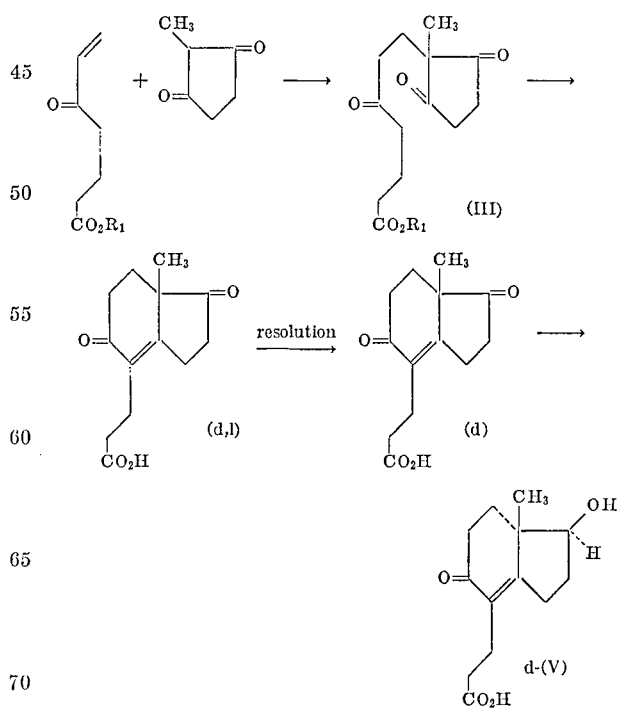

Compound V is then converted into a 19-nor steroid.

This sequence of reactions requires the operation of a conventional resolution of a racemic acid by an active base. This operation results in a yield of about 40%.

The bicyclic compound V, with a specific rotation $[\alpha]_D^{20} = +31.5° \pm 1°$ (c.≈1% in acetone), is of particular interest since it leads to the 19-nor steroid derivatives, such as estrone, 19-nor testosterone and all of the products to which they are related.

It has now been discovered that, according to the process of the present invention, it is possible to reduce microbiologically the compound IIIa, or 2-methyl-2-(3'-oxo-6'-carbomethoxy - hexyl) - cyclopentane-1,3-dione (III, $R_1=CH_3$), thus obtaining 1β-hydroxy-2β-methyl-2α-(3'-oxo-6'-carbomethoxy - hexyl) - cyclopentane-3-one, IVa (IV, $R=CH_3$) with a specific rotation $$[\alpha]_D \approx -35° \pm 2°$$

(c.≈2% in chloroform), which is convertible by cyclization in aqueous acid media into (+) 1β-hydroxy-5-oxo-4-(2'-carboxyethyl)-7a-β-methyl-5,6,7,7a-tetrahydro - indane, V, identical in all respects to the compound obtained according to the process outlined in the preceding and described in U.S. Pat. No. 3,413,314.

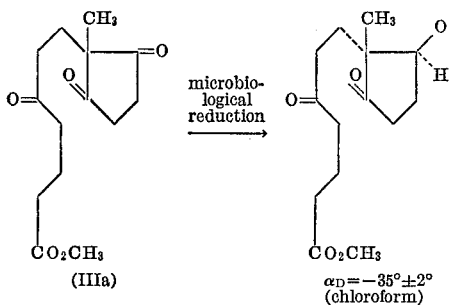

(IIIa)    $\alpha_D = -35° \pm 2°$
          (chloroform)
          (IVa)

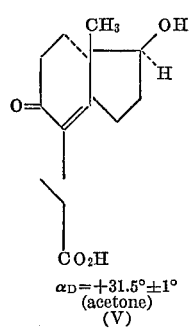

$\alpha_D = +31.5° \pm 1°$
(acetone)
(V)

The methyl ester IIIa is not the only ester capable of giving by microbiological reduction, according to the process of the invention, the isomer corresponding with the natural series. It is obvious that the other lower alkyl esters of compound III ($R_1$≈lower alkyl) can furnish the same result and that the selection of the methyl ester does not imply any limitation on the invention.

It was found that by utilizing, in particular, the fungi of the Rhizopus genus, such as the arrhizus or nigricans species, the isomer IVa was obtained in practically exclusive manner by reduction of the compound IIIa. Under these conditions, the other stereoisomers of type IVa could not be detected in the reaction mixture. In addition, the *Rhizopus arrhizus* species have given until now the best yield of compound IVa.

The mode of execution actually preferred consists in subjecting the compound IIIa to the reducing action of a *Rhizopus arrhizus* culture, Fischer (ATCC 11,145) under aerobic conditions.

The microbiological reduction is effected advantageously at a temperature of between 26° C. and 37° C. over a period extending from one to about four days. The starting dione is mixed either with the *Rhizopus arrhizus* culture in glucose media or with mycelium placed in suspension in distilled water after elimination of the culture media. It may be added, for example, in the form of an ethanolic solution or placed in suspension in the incubation media or in distilled water containing the previously introduced mycelium. It was observed that 4 gm. of mycelium are capable of reducing at least 8 gm. of cycloalkanedione, IIIa.

Under these conditions, the total amount of conversion of IIIa into IVa exceeds 07%. Therefore, the process of the invention appears superior to the former process, as it permits the preparation of the bicyclic compound V, starting with compound IIIa, with a greater yield and by fewer operational steps.

Within the body of the invention, it has also been established that the reduction of compound IIIa, for example, by *Mucor spinosus, Curvularia falcata, Streptomyces platensis, Pseudomonas aeruginosa* or *Pseudomonas tabacci*, effects the formation of a mixture of compound IVa and of a dextrorotatory diastereoisomer corresponding to the structure of (+) 1β-hydroxy-2α-methyl-2β - (3' - oxo-6'-carbomethoxy-hexyl)-cyclopentane-3-one, IVb.

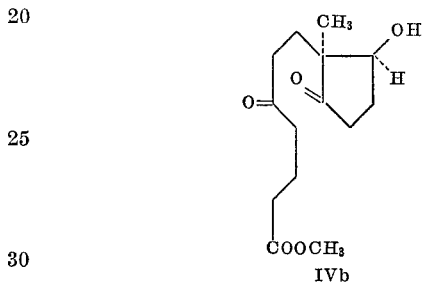

IVb

This compound IVb is obtained in practically exclusive fashion when the reduction of compound IIIa is effected, in particular, with *Aspergillus niger* or *Saccharomyces cerevisias*.

The compounds such as IVb are of a great interest regarding the total synthesis of steroids with inverted configuration presenting antihormonal properties. Moreover, it has been shown that compound IVb can be cyclized in acid media into (—) 1β-hydroxy-4-(2'-carboxyethyl) - 5-oxo-7a-α-methyl - 5,6,7,7a - tetrahydroindane, Vb, a diastereoisomer of compound V. Compound Vb is then oxidized with chromic acid into (—) 1,5-dioxo - 4 - (2'-carboxyethyl)-7a α-methyl-5,6,7,7a-tetrahydroindane VIb. The compounds Vb or VIb may then be converted into inverted steroids by employing the process described in U.S. Pat. No. 3,413,314.

The process of the invention may be employed for the purpose of reducing symmetrical cycloalkanediones, I, other than those of Formula III. Thus, by reduction of 2-methyl - 2 - (3'-oxo-butyl)-cyclopentane-1,3-dione, VII, in particular, with the aid of a *Rhizopus arrhizus* culture, levorotatory (chloroform) 1β - hydroxy-2β-methyl-2a-(3'-oxo-butyl)-cyclopentane-3-one, VIII, is obtained according to the following flow diagram:

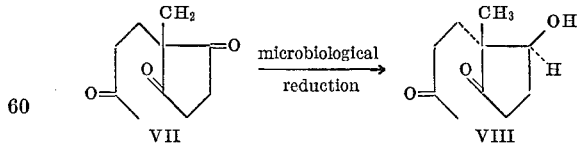

In the same manner, the reduction of 2-methyl-2-(3'-chloro-2'-butene-yl)-cyclopentane - 1,3 - dione, IX, for example, by means of a *Rhizopus arrhizus* culture, leads to dextrorotatory (chloroform) 1 - hydroxy-2-methyl-2-(3'-chloro-2'-butene-yl) - cyclopentane - 3-one, X.

The optically active compounds, such as compounds VIII and X, can serve as intermediates for the total synthesis of steroids. They are, for this reason, of great significance. It has been shown that compound VIII with a specific rotation $[\alpha]_D = -40° \pm 2°$ (c.=2% in chloroform) corresponds well with the natural series. In fact, compound VIII, after esterification into the p-nitrobenzoic ester XI, is converted first by cyclization in acid media, then by saponification into 1β-hydroxy-5-oxo-7a β-methyl-5,6,7,7a - tetrahydroindane in the form of p-nitrobenozic ester XII, with a specific rotation $[\alpha]_D = +92° \pm 2°$ (c.=0.5% in benzene) and thereafter into the free alcohol, XIIa, with a specific rotation $[\alpha]_D = +93°$ (c.=0.45% in benzene). Compounds XII and XIIIa have already been described and their structure determined.

The 3 - methoxy-8,14-seco-$\Delta^{1,3,5,(10),9(11)}$-estratetraene-14,17-dione subjected, according to the process of the invention, to the action of reducing enzymes, in particular, those products obtained by a *Rhizopus arrhizus* or *Aspergillus niger* culture, is reduced to a product presenting a levorotatory rotation with a specific rotation $[\alpha]_D = -22.5°$ (c.=2% in chloroform). A structure of 3-methoxy - 8,14-seco-$\Delta^{1,3,5(10),9(11)}$-estratetraene - 17-ol-14-one, of the natural series, has been attributed to this product. This compound is an optically active intermediate compound of great importance for the total synthesis of the steroids.

Also in accordance with the process of the invention, 2-methyl-2-(3'-oxo-butyl)-cyclohexane - 1,3 - dione was subjected to the action, for example, of a strain of *Rhizopus arrhizus* in a glucose media. Under these conditions, there resulted a formation of a levorotatory compound with a specific rotation $[\alpha]_D = -48° \pm 1°$ (c.=1.14% in chloroform), corresponding most probably with the structure of 1-hydroxy-2-methyl-2-(3'-oxo-butyl)-cyclohexane-3 - one in hemi-acetalic form. This compound can be converted according to the desired processes into D-homo-steroids.

The following examples will serve for better comprehension of the invention. However, it is to be understood that they do not limit the invention in any manner.

PREPARATION 1

2-methyl-2-(3'-oxo-6'-carbomethoxy-hexyl)-cyclopentane-1,3-dione, IIIa 63.9 gm. of methyl-5-oxo-6-heptenoate and 45.9 gm. of 2-methyl-cyclopentane-1,3-dione were introduced into a mixture of hydroquinone, 32 cc. of anhydrous pyridine and 140 cc. of anhydrous toluene. The mixture was heated at reflux under an atmosphere of nitrogen over a period of 16 hours. The solvents were distilled therefrom under vacuum and an oily residue was obtained which was used as such for the next step of operations or it was purified taking it up in methylene chloride. Next, this solution was washed with water, dried over sodium sulfate and evaporated to dryness. In this way, 95.5% of 2-methyl-2-(3'-oxo-6'-carbomethoxy - hexyl)-cyclopentane - 1,3-dione, IIIa, were isolated in the form of an amber-colored, odorous oil.

PREPARATION 2

2-methyl-2-(3'-chloro-2'-butene-yl)-cyclopentane-1,3-dione, IX

A solution containing 12.5% of potassium iodide in dimethylformamide was prepared by dissolving 15 gm. of potassium iodide in 150 cc. of dimethylformamide, of which solution 25 cc. were eliminated by distillation.

To 1.38 cc. of the solution prepared as described above and cooled to 0° C., 165 mg. of 1-pyrrolidyl-2-methyl-1-cyclopentene-3-one, prepared according to Pancuse et al. (Bull. Soc. Chim. 1956, page 1374) were added and the mixture was agitated for 15 minutes under total absence of light. Thereafter, 0.13 cc. of 1,3-dichlorobutene-2 were added to the mixture and the agitation was continued for 2½ hours under exclusion of light.

At the end of this period, 0.3 cc. of water were added to the reaction mixture and it was heated in an oil bath at about 95° C. for 2 hours. Next, the reaction mixture was cooled, poured into water and then extracted with methylene chloride. The extracts obtained were washed with water, dried, filtered and evaporated to dryness under vacuum.

The residue was subjected to chromatography through silica gel with elution with methylene chloride containing 1% of acetone thus obtaining 2-methyl-2-(3'-chloro-2'-butene-yl)-cyclopentane-1,3-dione with a yield of 36.2%.

EXAMPLE I

Preparation of 1β-hydroxy-2β-methyl-2α-(3'-oxo-6'-carbomethoxy-hexyl)-cyclopentane-3-one, IVa (a) The starting compound, in the form of an ethanolic solution, was admixed with an incubation mixture containing culture media and mycelium.

100 cc. of the culture media, hereinafter called "117-Glucose," were introduced into a flask of 250 cc. capacity. The culture media was prepared as follows:

| | Gm. |
|---|---|
| Glucose | 10 |
| Corn-steep liquid | 10 |
| Soybean meal | 10 |
| Dry malt extract | 5 |
| Calcium carbonate | 1 |
| Sodium chloride | 5 |
| Water q.s.p. 1000 cc. | |

After sterilization for 30 minutes at a temperature of 120° C. the media was inoculated with $5 \times 10^5$ spores of *Rhizopus arrhizus* Fischer (ATCC 11,145) per 1 cc. The media was cultivated under aerobic conditions in a rotary shaker for 24 hours at a temperature of 27° C. The preculture thus obtained served to inoculate the production stage. For this purpose, 100 cc. of the sterile media described in the preceding were introduced into a flask of 250 cc. capacity and inoculated with 10% of the preculture and cultivated for 24 hours under the same conditions as previously described.

At the end of this period, 0.2 gm. of 2-methyl-2-(3'-oxo-6'-carbomethoxy-hexyl)-cyclopentane - 1,3 - dione, IIIa, dissolved in 1 cc. of ethanol, were introduced therein. The reaction media was agitated first for 24 to 30 hours at 34° C., then for about 45 hours at 26 to 28° C. Next, the cultures, corresponding to 15 identical flasks, were combined. The mycelium was filtered and washed with water which was added to the filtrate. The latter was extracted with chloroform, and the chloroformic extract In this way 3.07 gm. of a residual oil were obtained prewas washed with water, dried and evaporated to dryness. senting a negative specific rotation $[\alpha]_D$ in the range of $-23°$ in chloroform. This oil, essentially composed of 1β-hydroxy-2β-methyl-2α-(3'-oxo-6'-carbomethoxy - hexyl)-cyclopentane-3-one, IVa, may be utilized as such for the cyclization into compound V or it may be purified. For this latter purpose, the oil was subjected to chromatography through a column of "Florisil" (an activated magnesium silicate). In this manner the homogeneous compound IVa was isolated in the form of an oil, presenting the I.R., R.M.N. and the circular dichroism spectra characteristic of its structure and a specific rotation $[\alpha]_D$ equal to $-35° \pm 2°$ (c.=2% in chloroform).

This compound is not described in the literature.

(b) The operative mode used was identical to that described in (a), but a different culture media was utilized.

Into a flask holding 250 cc., 100 cc. of a culture media, hereinafter called "318 Glucose" were introduced, prepared as follows:

| | Gm. |
|---|---|
| "Difco" yeast extract | 2 |
| Ammonium sulfate | 2 |
| Dipotassium phosphate | 0.5 |
| Calcium chloride, 2 molecules of water | 0.02 |
| Anhydrous magnesium sulfate | 0.4 |
| Manganese sulfate, 4 molecules of water | 0.05 |
| Zinc sulfate, 7 molecules of water | 0.005 |
| Iron sulfate, 7 molecules of water | 0.0005 |
| Copper sulfate, 5 molecules of water | 0.005 |
| Glucose | 10 |
| Lard oil | 2 |
| Water q.s.p. 1000 cc. | |

After a sterilization period of 30 minutes at 120° C., the media was inoculated with $5 \times 10^5$ of *Rhizopus arrhizus* spores (ATCC 11,145) per 1 cc., then the aggregate was aerobically cultivated in a rotary shaker for 24 hours at 27° C.

The preculture thus obtained served to inoculate the production stage. For this purpose, 160 cc. of the sterile media described previously were introduced into a flask of 250 cc. capacity. This media was inoculated with 10% of the preculture and cultivated for 24 hours under the same conditions as previously described.

Thereafter, 0.2 gm. of 2-methyl-2-(3'-oxo-6'-carbomethoxy-hexyl)-cyclopentane-1,3-dione, IIIa, was introduced, dissolved in 1 cc. of ethanol, and the reaction was allowed to take its course under the same conditions over a period of 72 hours. Next, the cultures represented in 100 identical flasks were combined; the mycelium was filtered and washed with water which was added to the filtrate and the whole filtrate was extracted with chloroform.

The chloroformic extract was washed with water, dried and evaporated to dryness. Thus, raw 1β-hydroxy-2β-methyl - 2α - (3'-oxo-6'-carbomethoxy-hexyl) - cyclopentane-3-one, IVa, was obtained (with a specific rotation $[\alpha]_D$ in the order of $-26°$). As mentioned under (a), the product could be purified by subjecting it to chromatography or it could be utilized as such for the subsequent steps.

(c) The starting compound, in the form of an ethanolic solution, was admixed with mycelium after the culture media had been eliminated.

A culture of *Rhizopus arrhizus* (ATCC 11,145) was effected in the manner as described under (b) until the 24 hours old production stage was obtained. At the end of this period the culture was centrifuged and the supernatant liquid was eliminated.

The mycelium was gathered, washed with water, then placed in suspension in 100 cc. of water and mixed with 0.4 gm. of 2-methyl-2-(3'-oxo-6'-carbomethoxy-hexyl)-cyclopentane-1,3-dione dissolved in 1 cc. of ethanol. The mixture was agitated for 72 hours at a temperature of 30° C.

After this time the culture was gathered; the mycelium was separated; the liquid phase was extracted with chloroform, and then the solvent of the organic phase was removed by evaporation, thus obtaining raw 1β-hydroxy-2β-methyl - 2α - (3'-oxo-6'-carbomethoxy-hexyl) - cyclopentane-3-one, IV, having a specific rotation $[\alpha]_D$ in the order of $-24°$.

In the same manner as described under (a), the product could be purified by subjecting to chromatography or it could be utilized as such for the following steps.

(d) The starting compound and mycelium, both suspended in distilled water.

A culture of *Rhizopus arrhizus* (ATCC 1y,145) was produced in the manner described under (c) until the obtention of the suspension of mycelium in 100 cc. of water.

Next, 0.6 gm. of 2-methyl-2-(3'-oxo-6'-carbomethoxy-hexyl)-cyclopentane-1,3-dione was introduced into the suspension, which was allowed to stand for 90 hours under agitation at a temperature of 30° C. Thereafter, the culture was gathered; the mycelium was separated by means of filtration and the liquid phase was extracted with chloroform.

The organic phase was evaporated to dryness under vacuum, thus obtaining raw 1β-hydroxy-2β-methyl-2α-(3'-oxo-6'-carbomethoxy-hexyl) - cyclopentane - 3 - one, IVa, having a specific rotation $[\alpha]_D$ in the order of $-23°$. As described under (a), the product could be purified by subjecting it to chromatography or it could be used as such for the following steps.

1β-hydroxy - 2β - methyl - 2α-(3'-oxo-6-carbomethoxy-hexyl)-cyclopentane-3-one, IVa, could be converted into 1β-hydroxy - 4 - (2'-carboxyethyl) - 5 - oxo - 7αβ-methyl-5,6,7,7a-tetrahydroindane, V, as follows:

Under an atmosphere of nitrogen, 1.62 gm. of 1β-hydroxy-2β - methyl - 2α - (3'-oxo-6'-carbomethoxy-hexyl)-cyclopentane-3-one, IVa, obtained without being purified under (a), were introduced into 8 cc. of aqueous 5.2 N hydrochloric acid. The mixture was heated first for 7½ hours at a temperature of 60° C. and thereafter for ½ hour at about 80° C.

After the mixture was iced for several hours, 1β-hydroxy - 4 - (2'-carboxyethyl) - 5 - oxo - 7aβ-methyl-5,6,7,7a-tetrahydroindane, V, was obtained, solvated by one molecule of water with a specific rotation $[\alpha]_D^{20} = +31.5° \pm 1°$ (c.=1% in acetone).

EXAMPLE II

Preparation of 1β-hydroxy-2α-methyl-2β-(3'-oxo-6'-carbomethoxy-hexyl)-cyclopentane-3-one, IVb Into a shaker flask of 250 cc. capacity, 100 cc. of a culture media called "304 DL" were introduced, this culture media consisting of:

| | Gm. |
|---|---|
| Sodium nitrate | 3 |
| Dipotassium phosphate | 1.3 |
| Magnesium sulfate solvated with 7 molecules of water | 0.5 |
| Ferrous sulfate solvated with 7 molecules of water | 0.01 |
| Potassium chloride | 0.5 |
| Dextrine | 30 |
| "Difco" yeast extract | 5 |
| Water q.s.p. 1000 cc. | |

Next, the media was inoculated with 6.5 cc. of an aqueous suspension of *Saccharomyces cerevisiae* Hansen, and the whole was agitated in a rotatory shaker for 24 hours at a temperature of 28° C.

10 cc. of the preculture thus obtained were used to inoculate 100 cc. of a media "17" containing 30 parts per thousand of glucose, prepared in the following manner:

| | Gm. |
|---|---|
| Glucose | 30 |
| Corn-steep liquid | 10 |
| Soya bean meal | 10 |
| Dry malt extract | 5 |
| Calcium carbonate | 1 |
| Sodium chloride | 5 |
| Water q.s.p. 1000 cc. | | and the inoculated media was agitated in a rotary shaker for 24 hours at a temperature of 28° C.

After this time, 200 mg. of 2-methyl-2-(3'-oxo-6'-carbomethoxy-hexyl)-cyclopentane-1,3-dione, IIIa, dissolved in 1 cc. of ethanol were introduced and the reaction mixture was agitated in a rotary shaker for 94 hours at a temperature of 28° C. Thereafter, the cultures of 50 identical shaker flasks were combined. The mycelium was filtered and washed with acetone. The acetonic wash meters were combined with the filtrate and all of it was extracted with chloroform.

After the organic extracts had been dried and distilled to dryness under vacuum, 1β-hydroxy-2αmethyl-2β-(3'-oxo-6'-carbomethoxy-hexyl) - cyclopentane-3-one, IVb, was obtained with a positive rotation $[\alpha]_D$ (chloroform).

This compound is not described in the literature.

1β-hydroxy - 2α-methyl - 2β-(3'-oxo-6'-carbomethoxy-hexyl)-cyclopentane-3-one, IVb, may be converted into levorotatory (acetone), 1β-hydroxy-4-(2'-carboxyethyl)-5-oxo-7aα-methyl-5,6,7,7a-tetrahydro-indane, Vb, in the following manner:

990 mg. of 1β-hydroxy-2α-methyl-2β-(3'-oxo-6'-carbomethoxy-hexyl)-cyclopentane-3-one, IVb, were introduced into 5 cc. of 5 N hydrochloric acid, and the mixture was heated for 1 hour over a steam bath. After customary separation steps, an acid fraction, successively recrystallized first from ether, then from ethyl acetate, supplied levorotatory 1β-hydroxy-4-(2'-carboxyethyl)-5-oxo-7aα-methyl-5,6,7,7a-tetrahydro-indane, Vb, having a melting point of 135° C. and a specific rotation $[\alpha]_D^{20} = -15° \pm 1°$ (c.=0.5% in acetone).

Ultraviolet spectra: (ethanol) $\lambda_{max.}$ 247–248 m$\mu$, $\epsilon = 12,800$.

*Analysis.*—Calculated: $C_{13}H_{18}O_4$ (molecular weight=238.27), percent: C, 65.53; H, 7.61. Found (percent): C, 65.6; H, 7.7.

This compound is not described in the literature.

The levorotatory (acetone) 1β-hydroxy-4-(2'-carboxyethyl)-5-oxo-7aα-methyl-5,6,7,7a-tetrahydro-indane, Vb, may be converted into 1,5 dioxo-4-(2'-carboxyethyl)-7aα-methyl-5,6,7,7a-tetrahydro-indane, VIb, in the following manner:

75 mg. of levorotatory (acetone) 1β-hydroxy-4-(2'-carboxyethyl)-5-oxo-7aα-methyl - 5,6,7,7a-tetrahydro-indane, Vb, were dissolved in 5 cc. of acetone; then the solution was cooled in an ice bath. 0.1 cc. of a chromic acid solution, prepared with 2.70 gm. of chromic acid anhydride, 2.30 cc. of sulfuric acid and water in a sufficient amount to obtain 10 cc. of mixture, were introduced therein. The reaction mixture was agitated for 15 minutes.

1,5-dioxo-4 - (2'-carboxyethyl) - 7aα-methyl-5,6,7,7a-tetrahydro-indane, VIb, was obtained having a melting point of 140° C. and a specific rotation $[\alpha]_D^{20} = 227°$ (in acetone).

This compound is not described in the literature.

EXAMPLE III

Reduction of 2-methyl-2 - (3'-oxo - 6'-carbomethoxy-hexyl)-cyclopentane-1,3-dione, IIIa, with *Streptomyces platensis*

The microbiological reduction was effected, for example, in the glucose media "117" or "318" under conditions analogous to those described in Example I. As a strain, *Streptomyces platensis* MacGuire (NRRL 2,364) was utilized. In this case, a mixture of 1β-hydroxy-2β-methyl-2α-(3'-oxo-6'-carbomethoxy-hexyl)-cyclopentane - 3-one, IVa, and of 1β-hydroxy-2α-methyl-2β-(3'-oxo-6'-carbomethoxy-hexyl)-cyclopentane-3-one, IVb, was formed, which could be separated by chromatographic means.

EXAMPLE IV

Reduction of 2-methyl-2-(3'-oxo-6-carbomethoxy-hexyl)-cyclopentane-1,3-dione, IIIa, by Pseudomonas The reduction by means of *Pseudomonas aeruginosa* ATCC No. 10,145 was effected under conditions analogous to Example I. The culture media employed was, however, different. It was composed of:

| | Gm. |
|---|---|
| Yeast autolysate | 5 |
| Bacteriological peptone | 5 |
| Malt extract | 2 |
| Sodium chloride | 5 |

Water, q.s.p., 1000 cc.

As in Example III, a mixture of the compounds IVa and IVb was formed, separable by chromatography.

EXAMPLE V

Preparation of 1β-hydroxy-2β-methyl-2α-(3'-oxo-butyl)-cyclopentane-3-one, VIII

A culture of *Rhizopus arrhizus* Fischer (ATCC 11,145) was prepared according to the working mode described in Example Ia. Next, with the aid of this culture 50 identical shaker flasks were processed, each containing 0.2 gm. of 2-methyl-2-(3'-oxo-butyl)-cyclopentane-1,3-dione, described by Boyce et al. (J. Chem. Soc., 2, p. 2022 [1959]) and, according to the process described in Example Ia, an oily product was isolated which was fractionated by chromatography through "Florisil."

Thus, 1β-hydroxy-2β-methyl-2α - (3'-oxo-butyl)-cyclopentane-3-one, VIII, was obtained with a specific rotation $[\alpha]_D^{20} = -40° \pm 2°$ (c.=2% in chloroform). Infrared, R.M.N. and circular dichroism spectras were in accord with the structure.

The product obtained was colorless, insoluble in water and soluble in most of the usual organic solvents.

*Analysis.*—Calculated $C_{10}H_{16}O_3$ (molecular weight=184.22), percent): C, 65.2; H, 8.75. Found (percent): C, 65.2; H, 8.7.

This compound is not described in the literature.

1β-hydroxy-2β-methyl-2α-(3' - oxo-butyl)cyclopentane-3-one, VIII can be converted into the p-nitrobenzoate ester of 1β - hydroxy-2β-methyl-2α-(3'-oxo-butyl)-cyclopentane-3-one, XI, in the following manner:

297 mg. of 1β-hydroxy-2β-methyl-2α-(3'-oxo-butyl)-cyclopentane-3-one, VIII, were introduced into 3 cc. of anhydrous benzene and 1.5 cc. of anhydrous pyridine. Next, under an atmosphere of nitrogen, a solution of 365 mg. of p-nitrobenzoyl chloride in 3 cc. of anhydrous benzene was added thereto. The reaction mixture was heated at a temperature of 50 to 55° C. for 15 minutes.

After recrystallization from a toluene-isopropyl ether mixture (1:2) the p-nitrobenzoate ester of 1β-hydroxy-2β-methyl - 2α - (3'-oxo-butyl)-cyclopentane - 3 - one, XI was obtained, having a melting point first of 98 to 99° C., then of 105° C., after recrystallization, with a specific rotation $[\alpha]_D^{20} = +47.5°$ (c.=0.5% in benzene).

Ultraviolet spectra: (ethanol) $\lambda_{max.}$ at 258 m$\mu$, $\epsilon = 13,900$.

This compound is not described in the literature.

The p-nitrobenzoate ester of 1β-hydroxy-2β-methyl-2α-(3'-oxo-butyl)-cyclopentane - 3 - one, XI, can be converted into the p-nitro-benzoate ester of 1β-hydroxy-5-oxo - 7aβ-methyl-5,6,7,7a-tetrahydro-indane, XII, as follows:

50 mg. of p-toluene sulfonic acid monohydrate were introduced into 25 cc. of anhydrous toluene and 5 cc. of the solvent were removed by distillation. Next, 0.46 gm. of the p-nitro-benzoate ester of 1β-hydroxy-2β-methyl 2α-(3' - oxo - butyl) - cyclopentane-3-one, XI, were added thereto. The mixture was heated at reflux for 5 hours. Thereafter, the reaction mixture was cooled, washed first with water, then with a saturated solution of sodium bicarbonate and again with water until the wash waters were neutral.

After drying and evaporation to dryness under vacuum, the residue was dissolved in toluene, then crystallized from iced isopropyl ether. The p-nitrobenzoate ester of 1β - hydroxy - 5 - oxo - 7aβ - methyl - 5,6,7,7a-tetrahydro-indane, XII, was obtained. This product had a melting point of 152° C. and a specific rotation $[\alpha]_D^{20} = +92° \pm 2°$ (c.=0.5% in benzene).

Ultraviolet spectra: (ethanol) $\lambda_{max.}$ at 243 m$\mu$ $\epsilon = 22,650$.

The saponification of the p-nitro-benzoate ester of 1β-hydroxy - 5 - oxo - 7aβ - methyl-5,6,7,7a-tetrahydro-indane by heating the compound at reflux in methanolic sodium hydroxide gave 1β-hydroxy-5-oxo-7aβ-methyl-5,6,7,7a-tetrahydro-indane, XIIa, which after crystallization from isopropyl ether had a melting point of 56 to 60° C. with a specific rotation $[\alpha]_D^{20} = +93°$ (c.=0.45% in benzene).

EXAMPLE VI

Preparation of 1-hydroxy-2-methyl-2-(3'-chloro-2'-butene-yl)-cyclopentane-3-one, X In a a flask of 250 cc. capacity, 100 cc. of a culture media called "117 Glucose" were introduced, prepared as described in Example Ia. After sterilizing this media for 30 minutes at a temperature of 120° C., the culture media was inoculated with *Rhizopus arrhizus* Fischer (ATCC 11,145) and aerobically cultivated for 24 hours at 27° C. in a rotary shaker.

Thus, a preculture was obtained which served to inoculate the production stage. For this purpose, 100 cc. of the sterile media "117 Glucose" were introduced into a 250 cc. flask. The media was inoculated with 10% of the preculture and cultivated for 24 hours under the same conditions as described previously.

After this period, 0.2 gm. of 2-methyl-2-(3'-chloro-2'-butene-yl)-cyclopentane-1,3-dione, IX, was introduced dissolved in 1 cc. of ethanol, and the reaction medium was agitated for 72 hours at a temperature of 28° C. Thereafter, the cultures, corresponding to 7 identical flasks, were combined. The mycelium was filtered and washed with water. The wash waters were combined with the filtrate and the whole was extracted with chloroform. The chloroformic extracts, wahed with water, dried and evaporated to dryness, furnished a residual oil representing a specific rotation of $[\alpha]_D$ positive.

This oil composed essentially of 1-hydroxy-2-methyl-2 - (3' - chloro - 2' - butene - yl) - cyclopentane-3-one, X, can be purified by subjecting it to chromatography through silica gel. In this way, after evaporation of the eluate, a homogenous, oily product was obtained, which crystallized in the form of rectangular platelets, on contact with petroleum ether, having a melting point of 60° C. with a specific rotation $[\alpha]_D^{20}=+49°$ (c.=2% in chloroform). The infrared spectra was in accord with the structure.

The product was colorless and soluble in most of the usual organic solvents.

*Analysis.*—Calculated: $C_{10}H_{15}O_2Cl$ (molecular weight =202.67) percent: C, 59.26; H, 7.45. Found (percent): C, 59.3; H, 7.5.

This compound is not described in the literature.

EXAMPLE VII

Preparation of 3-methoxy-8,14-seco-$\Delta^{1,3,5(10),9(11)}$-estratetraene-17-ol-14-one, of the natural series A shaker flask containing 100 cc. of the media called "117 Glucose" was inoculated with 1.5 cc. of an aqueous suspension of *Rhizopus arrhizus* Fischer (ATCC 11,145) at the rate of $7.5 \times 10^6$ of spores per cc. and the media was agitated in a rotatory shaker for 24 hours at a temperaure of 28° C.

Thereafter, 90 cc. of the said media "117 Glucose" containing 50 parts per thousand of glycerol were inoculated with 10 cc. of the suspension of the preceding preculture. Then a solution of 12 mg. of 3-methoxy-8,14-seco-$\Delta^{1,3,5(10),9(11)}$-estratetraene-14,17-dione (obtained according to the process described by Windholz et al./J. Org. Chem., 28, page 1092 (1963)/) in 1 cc. of 50% ethanol was immediately added. The culture was then agitated for 54 hours in a rotary shaker at 28° C.

The contents of 100 identical shaker flasks were combined and the mycelium was filtered and washed with acetone. The filtrate and the acetonic wash waters were combined, and the whole was extracted with chloroform. The organic extracts were dried and distilled to dryness, thus obtaining a levorotatory oil, which could be purified by subjecting it to chromatography through a column of "Florisil" and which supplied 3-methoxy-8,14-seco-$\Delta^{1,3,5(10),9(11)}$-estratetraene-17-ol-14-one of the natural series, with a specific rotation $[\alpha]_D^{20}=-22.5°$ (c.=2% in chloroform).

This compound is not described in the literature.

The levorotatory 3 - methoxy - 8,14 - seco-$\Delta^{1,3,5(10),9(11)}$-estraene-17-ol-14-one of the natural series was obtained under analogous conditions by subjecting 3-methoxy-8,14-seco-$\Delta^{1,3,5(10),9(11)}$-estratetraene-14,17-dione to the reductive action of a culture of *Aspergillus niger* Van Tieghem in the "117 Glucose" media.

8,14 - seco - $\Delta^{1,3,5(10),9(11)}$-estratetraene-3,17-diol-14-one was obtained by reduction according to the process of the invention of 8,14 - seco - $\Delta^{1,3,5(10),9(11)}$-estratetraene-3-ol-14,17-dione obtained according to the process described by Trogov et al., Steroids 4, 31 [1964], by employing the working method described previously.

8,14 - seco - $\Delta^{1,3,5(10),9(11)}$ - estratetraene-3,17-diol-14-one, which could be characterized by the formation of its methyl ether in the 3 position with the aid of diazomethane, is not described in the literature.

EXAMPLE VIII

Preparation of hemi-acetal of 1-hydroxy-2-methyl-2-(3'-oxo-butyl)-cyclohexane-3-one The reduction of 2-methyl-2-(3'-oxo-butyl)-cyclohexane-1,3-dione by *Rhizopus arrhizus* Fischer (ATCC 11,145) in "117 Glucose" media was effected under conditions analogous to those in Example I or V. The reaction was maintained for 96 hours. Following extraction, a colorless liquid product was isolated by means of chromatography, having a specific rotation of $[\alpha]_D=-48°\pm1°$ (c.=1.14% in chloroform). The structure of this product corresponds to 1 - hydroxy - 2 - methyl-2-(3'-oxo-butyl)-cyclohexane-3-one in hemi-acetalic form.

*Analysis.*—Calculated: $C_{11}H_{18}O_3$ (molecular weight =198.25) percent: C, 66.64; H, 9.15; O, 24.21. Found (percent): C, 67.0; H, 9.0; O, 24.4.

The preceding specific embodiments are illustrative of the invention. It is readily apparent, however, that other expedients, as disclosed or as known in the art, may be employed without departing from the spirit of the invention or the scope of the appended claims.

We claim:
1. Levorotatory 1$\beta$ - hydroxy - 2$\beta$ - methyl - 2$\alpha$-(3'-oxo-6'-carbomethoxy-hexyl)-cyclopentane-3-one.

References Cited

UNITED STATES PATENTS 3,505,387  4/1970  Beal et al. _____ 260—408

OTHER REFERENCES

Bellet et al.: Compte Rendu C 263, 88, 1966.

LEWIS GOTTS, Primary Examiner

R. GERSTL, Assistant Examiner

U.S. Cl. X.R.

195—30, 51R; 260—514R